(12) United States Patent
Fucci

(10) Patent No.: US 9,386,181 B2
(45) Date of Patent: Jul. 5, 2016

(54) DEVICE PROXIMITY DETECTION

(71) Applicant: Google Inc., Mountain View, CA (US)

(72) Inventor: Marco Fucci, San Francisco, CA (US)

(73) Assignee: Google Inc., Mountain View, CA (US)

( * ) Notice: Subject to any disclaimer, the term of this patent is extended or adjusted under 35 U.S.C. 154(b) by 116 days.

(21) Appl. No.: 14/231,642

(22) Filed: Mar. 31, 2014

(65) Prior Publication Data

US 2015/0280843 A1 Oct. 1, 2015

(51) Int. Cl.
| | | |
|---|---|---|
| H04B 17/27 | (2015.01) | |
| H04N 1/00 | (2006.01) | |
| G06K 15/00 | (2006.01) | |
| G06F 21/00 | (2013.01) | |
| G06F 21/31 | (2013.01) | |
| G06F 21/32 | (2013.01) | |

(52) U.S. Cl.
CPC ............ *H04N 1/00973* (2013.01); *G06F 21/00* (2013.01); *G06F 21/31* (2013.01); *G06F 21/32* (2013.01); *G06K 15/00* (2013.01); *G06K 15/402* (2013.01); *G06K 15/4095* (2013.01); *H04N 1/00347* (2013.01); *H04N 1/00838* (2013.01)

(58) Field of Classification Search
None
See application file for complete search history.

(56) References Cited

U.S. PATENT DOCUMENTS

| | | | |
|---|---|---|---|
| 2003/0001723 A1 | 1/2003 | Masudaya | |
| 2006/0164209 A1 | 7/2006 | De Zeeuw | |
| 2009/0006032 A1 | 1/2009 | Wilcox et al. | |
| 2009/0131082 A1* | 5/2009 | Gast ...................... | G01S 5/0205 455/457 |
| 2011/0078549 A1 | 3/2011 | Thueringer et al. | |
| 2012/0249296 A1 | 10/2012 | Savry et al. | |
| 2012/0290481 A1* | 11/2012 | Finkenzeller .......... | G06Q 20/32 705/44 |
| 2013/0116964 A1 | 5/2013 | van Roermund et al. | |
| 2013/0143594 A1 | 6/2013 | Ghabra et al. | |
| 2013/0214909 A1* | 8/2013 | Meijers ................ | H04W 4/008 340/10.5 |
| 2014/0011458 A1 | 1/2014 | Koga et al. | |
| 2014/0334466 A1* | 11/2014 | Ignatchenko ......... | H04W 4/008 370/338 |

* cited by examiner

*Primary Examiner* — Jackie Zuniga Abad
(74) *Attorney, Agent, or Firm* — Morris & Kamlay LLP

(57) ABSTRACT

A method for detecting proximity of two communicating devices is disclosed. Proximity may be determined by measuring deviation from standardized signal timing specifications. An embodiment uses inter-frame space parameters specified by the Bluetooth Low Energy protocol to do proximity detection, and presents a solution that may prevent or mitigate relay attacks. The method offers the advantage that the use of an existent frame timing protocol eliminates the need for specific hardware or firmware modifications.

13 Claims, 4 Drawing Sheets

DEVICE PROXIMITY DETECTION

BACKGROUND

Detecting proximity between portable computing devices is increasingly useful as the number of uniquely identifiable devices that communicate through networked communications continues to increase, and the use of such devices continues to proliferate. Examples where proximity detection is important include unlocking a door, paying in a store with a mobile device, accessing secure computing resources, and the like.

Some applications, such as payment systems, require a high level of security. Existing security methods may be adequate to ensure the identity of the devices, and the confidentiality of the data transmitted locally. It may be difficult, however, to ensure that communication between two devices actually occurs with those devices in proximity of one another, since the communication may be vulnerable to an unsophisticated relay attack that imitates the proximity between devices.

BRIEF SUMMARY

According to an embodiment of the disclosed subject matter, a method of detecting proximity between two communicating devices is disclosed. An embodiment of the method uses inter-frame space parameters specified by a wireless protocol (e.g. Bluetooth Low Energy (LE)) to perform proximity detection and may be used to prevent or mitigate relay attacks.

An embodiment of the method includes performing an operation to initiate a dialog between a first device and a second device. The dialog includes synchronizing the timing of the second device with the timing of the first device, by synchronizing the communication of frames between the first device and the second device. The dialog between the first device and the second device may include initiating an encryption protocol. The method further includes preparing a portion of data on the first device (e.g. a random number) into at least one frame, and sending the portion of data from the first device to the second device. The method also includes sending an instruction, in at least one frame to the second device, and requesting a copy of the portion of data to be sent in a consecutive frame from the second device to the first device. Also included is determining and storing a first time record of the trailing edge of the trailing frame of the instruction, followed by receiving the portion of data from the second device, and determining a second time record of receipt of the leading edge of a leading frame of the portion of data received by the first device. The method continues with performing an operation to subtract the first time record from the second time record to determine a time difference, and performing an operation to subtract a first parameter value from the time difference to determine a latency value. A latency value not greater than a deviation parameter value indicates proximity between the first device and the second device. The first parameter value used in the method may be an inter-frame space (IFS) parameter value, expressed as a function of time. The deviation parameter value may be an IFS deviation value expressed as a function of time or a mathematical expression of a portion of the IFS value.

The method also includes determining a proximity value by calculating the product of the latency value and the speed of light, where a latency value larger than the deviation parameter may indicate the presence of a relay attack.

Systems and devices as disclosed herein may include a means for synchronizing time between two devices, means for sending data from one device to the other and instructing the receiving device to provide a response in the next frame. Also included may be means for determining a time record of an instruction frame and a response frame, determining a time difference based upon the send and receive frames and a latency value for the communication, and for determining whether a relay attack has occurred based upon the latency.

Techniques and systems as disclosed herein may allow for verification of a device or user proximity to prevent certain type of attacks, such as relay attacks. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Generally, techniques and systems for detecting proximity between two communicating devices are disclosed. Proximity may be determined by measuring deviation from standardized signal timing specifications. In some configurations, the proximity may be determined based upon an elapsed time value and the speed of light, thus setting an upper bound on the possible distance between two devices that are presumed to be in proximity to one another.

A method is presented that uses characteristics of wireless protocols (e.g. Bluetooth Low Energy (LE) protocol) and physical properties associated with data communication (e.g. the speed of light) to ensure that communicating devices are in proximity with one another. Bluetooth LE technology is ubiquitous technology and can be used to do proximity detection. Techniques and systems as disclosed herein also may prevent or mitigate relay attacks by devices faking proximity.

Figure 3:
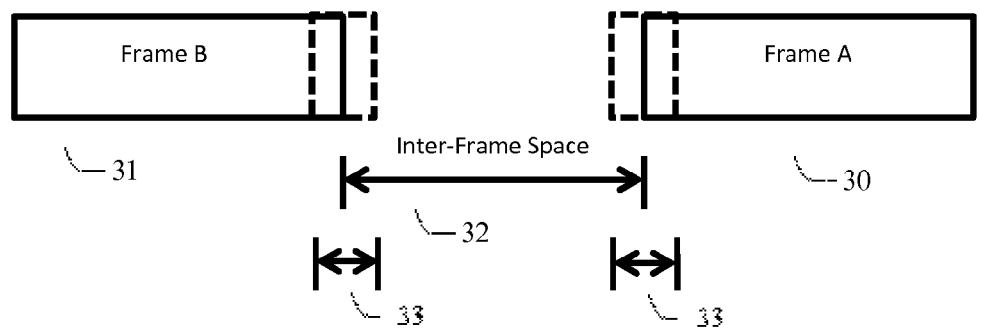
FIG. 3 shows a frame and inter-frame space according to an embodiment of the disclosed subject matter.

Embodiments described herein use data framing characteristics such as the inter-frame space (IFS) and the inter-frame space deviation ($IFS_{dev}$) specification of wireless protocols for determining device proximity. FIG. 3 shows a frame and inter-frame space according to an embodiment of the presently disclosed subject matter. Two contiguous frames of data, frame A 30 and frame B 31, are separated by an inter-frame space 32. According to Bluetooth version 4.0 LE specifications, the Inter Frame Space 32 is 150 microseconds (μs) and all instantaneous timings shall not deviate more than 2 microseconds (μs) from the average timing, therefore, the inter-frame space deviation 33 is +/−2 μs.

Figure 4:
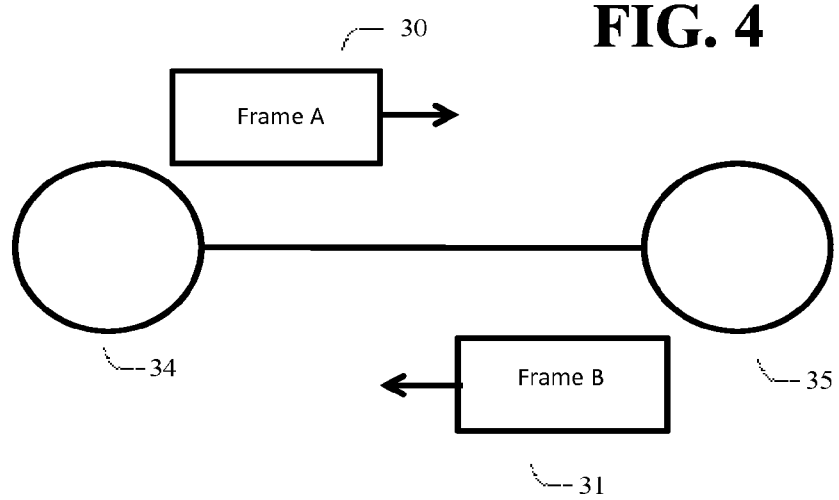
FIG. 4 shows an example layout, such that a first device and a second device are directly communicating according to an embodiment of the disclosed subject matter.
Figure 5:
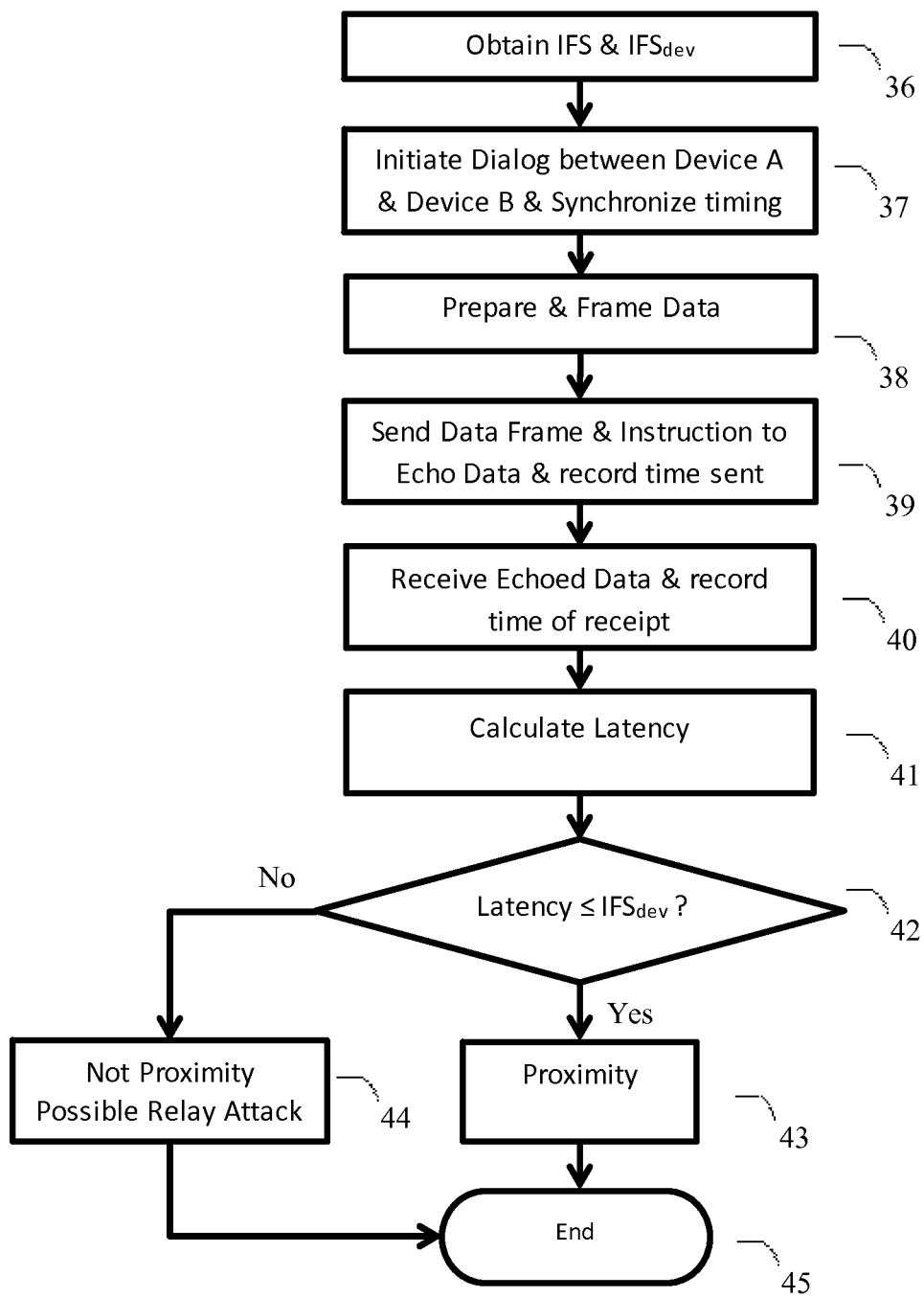
FIG. 5 shows an block diagram for a method according to an embodiment of the disclosed subject matter

As disclosed herein, it may be desirable to verify that communications between a first device and a second device occur when the devices are in proximity of one another. FIG. 4 shows an example layout such that a first device (Device_A 34) and a second device (Device_B 35) are directly communicating. FIG. 5 shows a block diagram outlining the method according to an embodiment of the disclosed subject matter. A communication protocol (e.g. Bluetooth 4.0 LE) that specifies an inter-frame space (IFS) is instituted for communication between two devices. The IFS and a an IFS deviation ($IFS_{dev}$) is specified and communicated to (or previously stored on) the two devices at 36. Device_A 34 and Device_B 35 initiate a dialog that may use an encrypted connection, and the two devices authenticate each other using some cryptographic secrets over the secure connection. The timing of the two devices are synchronized to coordinate receipt and transmission of data frames at 37. Device_A 34 ensures its proximity to Device_B 35 by requesting that Device_B 35 echo a data frame (e.g. a random number) at 38 in a fast sequence (e.g., a contiguous frame), over the encrypted channel at 39. The time that the instruction frame is sent is recorded at 39 and the time of receipt of the echoed data is also determined at 40. The Latency is calculated by calculating the difference in time of sending and receipt of a response and subtracting the IFS at 41. If the Device_A 34 receives the echoed data from Device_B 35 in the contiguous frame and within the time allocated by the timing specifications (e.g. $IFS_{dev}$) at 42, Device_B 35 is guaranteed to be in an acceptable proximity of Device_A 34 at 43. If the latency exceeds $IFS_{dev}$, the devices may not be in proximity, and this may signal a possible relay attack at 44. If devices are in proximity, then communication between them continues until ended at 45. If the two devices are not in proximity, the process ends at 45 until a new communication is initiated. It is important to realize that a data frame may only be accepted by a receiving device if the timing of an incoming frame matches the specified required spacing between the incoming frame and the preceding frame (e.g. IFS) within a specified timing deviation (e.g. $IFS_{dev}$). The inter-frame space is measured from the trailing edge of the preceding frame to the leading edge of the current frame received. The inter-frame space deviation may be symmetrical (e.g. +/−2 μs) and is measured at both edges of the inter-frame space, adjacent to the trailing edge of the preceding frame and the leading edge of the current frame. Although described with reference to the Bluetooth LE specification, it will be apparent to one of skill in the art that the techniques disclosed herein are not so limited, and may be used with any appropriate communication protocol and techniques.

The following mathematical analysis demonstrates how signal latency, and thereby proximity, may be determined by using the transmission characteristics of a protocol that specifies an inter-frame space with an inter-frame space deviation, such as Bluetooth LE. For two devices, Device A 34 and Device B 35, located at a certain distance apart ($D_{AB}$), the latency introduced as a result of transmission delay between the devices, ($L_{AB}$), is equal to $D_{AB}/c$, where c is the speed of light. In an ideal model, signal (e.g. data bit) propagation would occur at the speed of light (i.e. approximately 300,000 km/sec), but in real-world applications the speed of transmission is reduced. Therefore, an instruction requesting Device_B 35 to send some quantity of data to Device_A 34 experiences a transmission latency ($L_{AB}$). The earliest that Device_B 35 can begin transmitting Frame B 31 to Device_A 34 after receiving the instruction to do so is the inter-frame space (IFS) minus the inter-frame space deviation ($IFS_{dev}$) (e.g. 150 μs-2 μs for Bluetooth LE). The clock of Device_B 35 may be shifted by the transmission latency, $L_{AB}$, compared to the clock of Device_A 34. Transmission of the frame sent by Device B 35 will also be subject to the transmission latency ($L_{AB}$). As a result, the earliest that the Device_A 34 can expect the frame from Device_B 35, after sending an instruction, is equal to the inter-frame space minus the inter-frame space deviation, plus the sending frame transmission latency, plus the receiving frame transmission latency (i.e., $IFS-IFS_{dev}+2L_{AB}$). For example, according to the Bluetooth LE specification, for the contiguous frame to be accepted by the first device, the frame must arrive no later than the inter-frame space, plus the inter-frame space deviation (i.e., $IFS+IFS_{dev}$). Solving for the maximum allowable transmission latency between the first and second device indicates that the latency must be no greater than the allowable inter-frame space deviation (i.e., $IFS_{dev}$). For Bluetooth 4.0 LE, for example, where the IFS is 150 μs, and the $IFS_{dev}$ is +/−2 μs, $L_{AB}$ must not be greater than 2 μs. As a result, the maximum separation of the two devices (defining a "proximity") is given by $D_{AB} \leq c L_{AB} \leq$ approximately 600 meters. A device separation greater than 600 meters would cause the frame to arrive too late to be accepted as an adjacent frame by the first device. As a result, an attack by a second device outside the proximity of the first device, that might be faking proximity, may be detected by the method described above.

Figure 6:
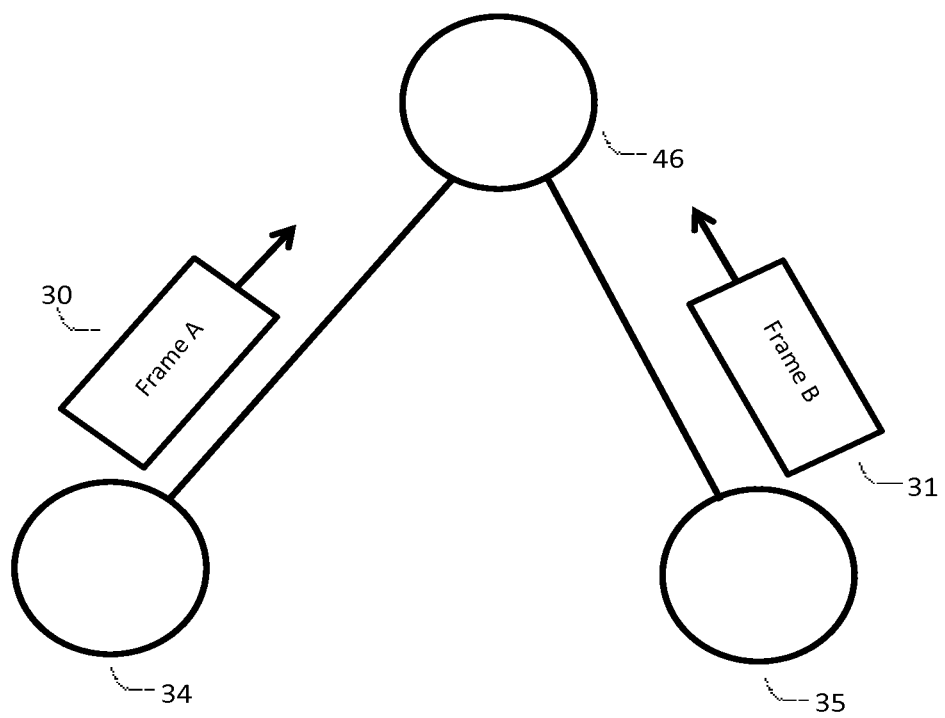
FIG. 6 shows an example layout, such that a first device and a second device are communicating through a relay device according to an embodiment of the disclosed subject matter.

Generally, it is the intention that communications between a first device and a second device in proximity of one another not to be compromised by a relay attack by a distant third device. A relay attack by an intermediary device (i.e. "man in the middle"), also may cause increased latency in transmission of a frame, due to data processing operations within the intermediary device itself and from the increased transmission distance associated with routing through the intermediary device. FIG. 6 shows an example layout of devices under a "man in the middle" relay attack, such that the first device (Device_A 34) and a second device (Device_B 35) are not directly communicating, but rather all communication is routed through a third (relay) device (Device_R 46). Under this scenario, a latency associated with the relay device, $L_r$, is introduced. All data sent in frames from Device_A 34 is routed through Device_R 46 before being received by Device_B 35. The latency between Device_A 34 (34) and Device_B 35 becomes equal to $Lr+D_{AB}/c$, where $D_{AB}$ is the distance between Device_A 34 and Device_B 35, using the signal routing path through the intermediary device, Device_R 46. As a result, in response to an instruction from Device A 34 to echo a data frame, the earliest that the Device_A 34 can expect a responding frame (i.e. Frame B 31) from Device_B 35, after sending the instruction in Frame A 30 is equal to the inter-frame space (IFS) minus the inter-frame space deviation ($IFS_{dev}$) plus the sending frame transmission latency ($L_{AB}$) plus the receiving frame transmission latency ($L_{AB}$) plus the relay latency (Lr) (i.e., $IFS-IFS_{dev}+2L_{AB}+Lr$). The latency, $L_{AB}$, includes any additional delay caused by the extended transmission path length caused by routing the frame through the intermediary device, Device_R 46. As in the case where no device acts as an intermediary, for the contiguous frame to be accepted by the first device, the frame must arrive no later than the inter-frame space, plus the inter-frame space deviation (i.e., IFS+IFS$_{dev}$). Solving for the maximum allowable transmission latency between the two devices indicates that the latency must be no greater than the allowable inter-frame space deviation minus the relay latency (i.e., $L_{AB} \leq IFS_{dev} - L_r$). Continuing with the Bluetooth 4.0 LE specification embodiment, the maximum separation of Device_A 34 and Device_B 35, taking a path through the Device_R 46 is $D_{AB} \leq c \, L_{AB} \leq$ approximately 600 meters if the relay introduces no additional delay (i.e. $L_r = 0$). If $L_r$ equals zero, a relay path greater than 600 meters would cause Frame B 31 to arrive too late to be accepted as an adjacent frame by the Device A 34. As a result, introduction of an intermediary device, outside the proximity of the first and second devices, would be discovered and actions could be initiated to obstruct the relay attack.

The disclosed method may be modified such that the frame returned by the second device to the first device is not sent in the next frame but instead at a later time, after a fixed number of frames. This type of implementation, however, may be less secure than having the data sent in an adjacent frame.

Use of disclosed methods in a computing environment may be checked by staging a false relay attack against two devices which are in proximity of each other and purposefully increasing the frame latency. If a relay attack is detected, then at least one of the devices is using a method as disclosed herein. If a relay attack is not detected, then an alternative mechanism is used to secure proximity detection, or no proximity detection is performed.

According to embodiments of the disclosed subject matter, one advantage of the methods described herein is that they may a single, existing standard technology protocol (e.g. Bluetooth LE) to secure the connection against relay attack, which typically will already be available in devices in which the techniques are to be used. Furthermore, the simplicity of the method and the use of an already existent frame timing protocol, may provide that no specific hardware or firmware modifications are required for implementation. The method is also flexible, and may be used with communication protocols other than Bluetooth LE, i.e. the same principle may be used to ensure proximity with Bluetooth Classic or Wi-Fi.

Devices and techniques disclosed herein may be used by any solution which uses proximity as part of the security. Example applications that could benefit from the proximity detection of the disclosed embodiments include electronic payments, peer-to-peer data transfer, and access control. Specific application examples include unlocking a door when in the proximity of the door, logging into a computer when in proximity of that computer, and transferring payment when in the proximity of a Point of Sale (POS) System.

Figure 1:
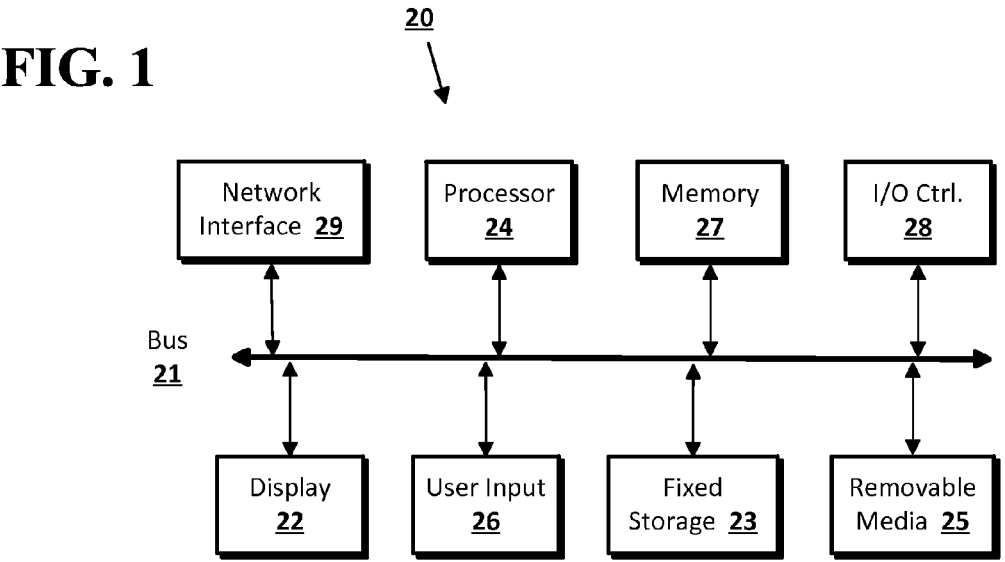
FIG. 1 shows a computer according to an embodiment of the disclosed subject matter.

FIG. 1 is an example computer 20 suitable for implementing embodiments of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
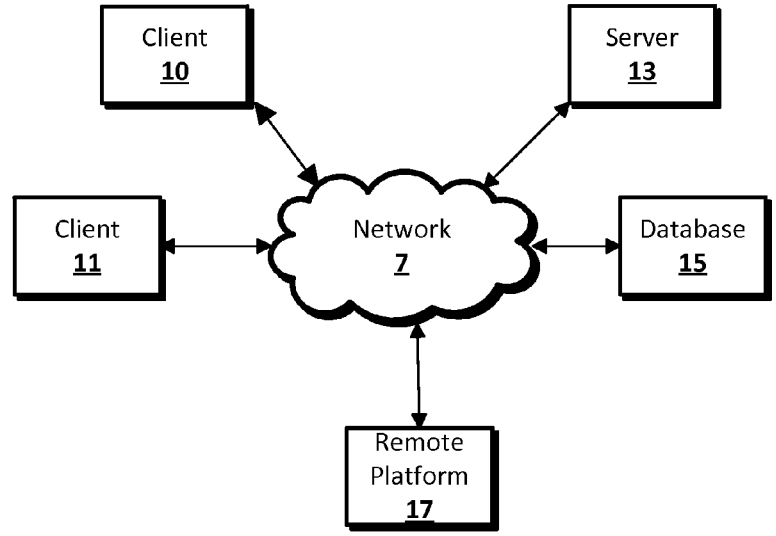
FIG. 2 shows a network configuration according to an embodiment of the disclosed subject matter.

FIG. 2 shows an example network arrangement according to an embodiment of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
   synchronizing a timing of a first device with the timing of a second device;
   sending a portion of data from the first device to the second device in at least one frame;
   sending an instruction to the second device, requesting a copy of the portion of data to be sent in a consecutive frame from the second device to the first device;
   storing a first time record of a trailing edge of a trailing frame of the instruction;
   receiving the portion of data from the second device;
   determining a second time record of receipt of a leading edge of a leading frame of the portion of data received by the first device;
   determining a time difference between the first time record and the second time record;
   determining a latency value based upon a difference between the time difference and an inter-frame space time value specified by a communication protocol;
   comparing the latency value to an inter-frame space deviation time value specified by the communication protocol; and
   detecting an indicator of a relay attack based on the comparison of the latency value to the inter-frame space deviation time value.

2. The method of claim 1, wherein the communication protocol comprises a Bluetooth Low Energy protocol.

3. The method of claim 1, further comprising initiating an encryption protocol between the first device and the second device.

4. The method of claim 1, wherein the portion of data comprises a random number generated by the first device.

5. The method of claim 1, further comprising determining a proximity value as a product of the latency value and the speed of light.

6. The method of claim 1, wherein a latency value larger than the inter-frame space deviation time value indicates a presence of a relay attack.

7. The method of claim 1, wherein synchronizing the timing comprises synchronizing a communication of frames between the first device and the second device.

8. A communication device comprising a memory and a processor in communication with the memory, the memory storing instructions that when executed by the processor:
   synchronize a timing of the communication device with the timing of a remote device;
   send a portion of data to the remote device in at least one frame;
   send an instruction to the remote device, requesting a copy of the portion of data to be sent in a consecutive frame from the remote device to the communication device;
   store a first time record of a trailing edge of a trailing frame of the instruction;
   receive the portion of data from the remote device;
   determine a second time record of receipt of a leading edge of a leading frame of the portion of data received by the communication device;
   determine a time difference between the first time record and the second time record;
   determine a latency value based upon a difference between the time difference and an inter-frame space time value specified by a communication protocol;
   compare the latency value to an inter-frame space deviation time value specified by the communication protocol; and
   detect an indicator of a relay attack based on the comparison of the latency value to the inter-frame space deviation time value.

9. The device of claim 8, wherein the memory further stores instructions to initiate an encryption protocol between the communication device and the remote device.

10. The device of claim 8, wherein the portion of data comprises a random number generated by the communication device.

11. The device of claim 8, wherein the memory further stores instructions to determine a proximity value as a product of the latency value and the speed of light.

12. The device of claim 8, wherein a latency value larger than the inter-frame space deviation time value indicates a presence of a relay attack.

13. A method comprising:
   sending, by a first device, a portion of data through a relay device to a second device in at least one frame;
   sending, by the first device, an instruction to the second device, requesting a copy of the portion of data to be sent in a consecutive frame from the second device to the first device;
   storing, by the first device, a first time record of a trailing edge of a trailing frame of the instruction;
   receiving, by the first device, the portion of data from the second device;
   determining, by the first device, a second time record of receipt of a leading edge of a leading frame of the portion of data received by the first device;

determining, by the first device, a time difference between the first time record and the second time record;

determining, by the first device, a latency value based upon the difference between the time difference and an inter-frame space time value specified by a communication protocol;

determining, by the first device, a modified inter-frame space deviation time value based upon a difference between an inter-frame space deviation time value specified by the communication protocol and a relay latency value for the relay device;

comparing, by the first device, the latency value to the modified inter-frame space deviation time value; and detecting, by the first device, an indicator of a relay attack based on the comparison of the latency value to the modified inter-frame space deviation time value.

* * * * *